United States Patent [19]
Yamashita et al.

[11] 3,991,249
[45] Nov. 9, 1976

[54] FABRIC MATERIAL FOR PRODUCING WOVEN AIR BAGS UTILIZED FOR PROTECTING RIDERS IN VEHICLES

[75] Inventors: Shigeji Yamashita, Shiga; Katsutoshi Ando, Otsu; Toshio Yamaoku, Otsu; Taisuke Date, Otsu, all of Japan

[73] Assignee: Toray Industries, Inc., Tokyo, Japan

[22] Filed: Jan. 17, 1975

[21] Appl. No.: 541,919

[52] U.S. Cl. .................... 428/257; 139/389; 428/35; 428/262; 428/12
[51] Int. Cl.² ...................... D03D 1/04; D03D 11/02
[58] Field of Search ............... 139/389; 161/88, 92, 161/139; 280/150 AB; 428/245, 35, 188, 178, 257, 262

[56] References Cited
UNITED STATES PATENTS

| | | | |
|---|---|---|---|
| 592,057 | 9/1897 | Knight | 139/389 |
| 2,536,587 | 1/1951 | Whalley | 161/139 |
| 3,680,886 | 8/1972 | Mazelsky | 280/150 AB |
| 3,792,873 | 2/1974 | Buchner et al. | 139/389 |
| 3,829,353 | 8/1974 | Fisher | 161/139 |
| 3,862,878 | 1/1975 | Azuma | 161/139 |

FOREIGN PATENTS OR APPLICATIONS

| | | | |
|---|---|---|---|
| 1,022,080 | 2/1953 | France | 139/389 |
| 1,601,672 | 9/1970 | France | 139/389 |
| 713,891 | 9/1966 | Italy | 139/389 |

*Primary Examiner*—James J. Bell
*Attorney, Agent, or Firm*—Haseltine, Lake & Waters

[57] ABSTRACT

An improved fabric material for producing woven air bags utilized for protecting riders in vehicles. The fabric material is composed of a plurality of tubular weave portions formed along the warp direction and a stitched portion formed between two adjacent tubular weave portions. Each stitched portion is provided with at least single small tubular weave construction formed along a warp direction. The warp yarns forming the face fabric of a large tubular weave portion and the warp yarns forming the back fabric of the large tubular weave portion are respectively used as the warp yarns for forming the back fabric of the successive small tubular weave construction and the warp yarns for forming the face fabric of the successive small tubular weave construction. Woven air bags are produced by cutting the central portion of the stitched portion along a weft direction. The fabric material may be coated with a thin layer of coating resin material.

12 Claims, 48 Drawing Figures

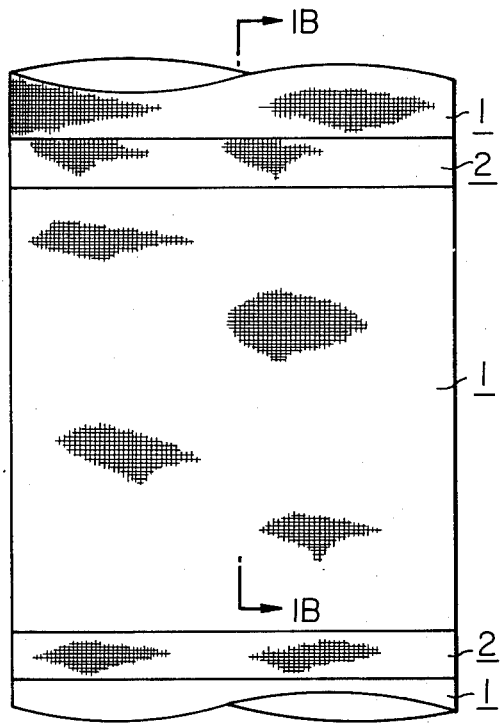
Fig. IA
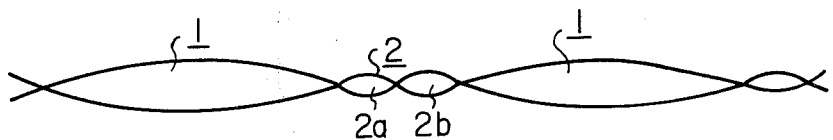
Fig. IB
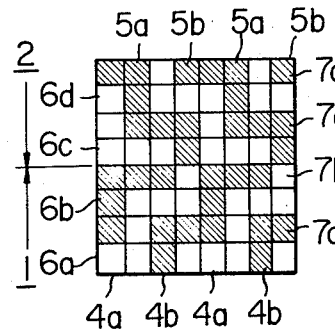
Fig. IC
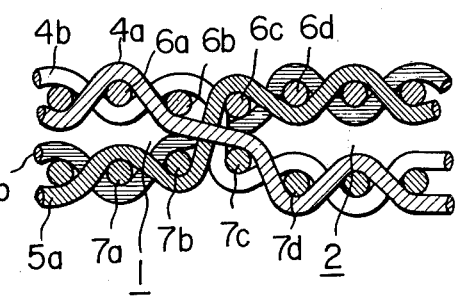
Fig. ID

FABRIC MATERIAL FOR PRODUCING WOVEN AIR BAGS UTILIZED FOR PROTECTING RIDERS IN VEHICLES

SUMMARY OF THE INVENTION

The present invention relates to a fabric material for producing woven air bags utilized for protecting riders in vehicles such as automobiles, when the vehicle strikes an obstacle at high speed and, particularly, to an improved fabric material for producing woven air bags utilized for protecting riders in vehicles, which has a very strong resistance to instantaneous increase of the gas pressure in the bag.

Recently, it has been proposed to utilize air bags to protect riders in vehicles, such as automobiles, at the time of high speed accidents. That is, when the vehicle strikes a relatively solid obstacle at high speed, the air bag mounted in the passenger compartment of the vehicle is instantly filled with high pressure gas so that the riders in the vehicle are protected from injury caused by direct impact with the inside elements of the vehicle by the inflated air bag. Naturally, it is necessary that such an air bag have very strong physical properties, such as strong resistance to breakage or leaks when the bag is instantly inflated by the supply of the high pressure gas into the air bag, and a sufficient resistance to breakage or leaks at the time of the secondary increase of the gas pressure in the air bag due to the impact of the rider against the air bag when the vehicle strikes a relatively solid obstacle.

However, one of the conventional air bags, because it is manufactured to form a bag-shape by sewing, has the defect that uneven distribution of stress is created at the sewn portions when high pressure gas is instantly supplied into the air bag at the time of accident; these sewn portions, therefore, become weak points, so that desirable protection by the air bag is spoiled. To improve the above-mentioned drawback of the air bag, it has been proposed to utilize a fabric in tubular form as an air bag. That is, a continuous fabric in tubular form is first woven. A plurality of stitching portions are formed in such a condition that each stitching portion extends across the entire width of the continuous fabric so that a fabric portion of tubular form is constructed between two adjacent stitching portions. The above-mentioned continuous fabric is separated at each stitching portion by cutting. According to our experience, it was found that the woven construction of the stitched portion greatly affects the bursting strength of the air bag. That is, in the case of applying such a stitched portion construction wherein a face fabric construction and a back fabric construction of the tubular form fabric are combined as a single layer fabric at the stitched portion, the number of the crossing points of a warp yarn and a weft yarn is greatly increased and, consequently, the crossing angle of the warp yarn between two adjacent weft yarns becomes steep. And, when the air bag is expanded by the instantaneous supply of high pressure gas, the stress due to the inflation of the air bag is concentrated at the boundary between the tubular weave portion and stitched portion. In this condition, the warp yarn at this boundary portion receives a stronger shearing force than the weft yarn and, consequently, the air bag is broken due to the breakdown of the warp yarns. Further, since the number of crossing point of a warp yarn and a weft yarn is increased very much at this stitched portion, the length of the stitched portion along the direction of warp yarn is increased and, consequently, the balance of stress distribution between the above-mentioned length of the stitched portion and the width of the tubular form fabric along a weft direction is broken so that creases are created in the stitched portion. When the air bag is inflated by supplying high pressure gas, the stress is concentrated at this crease portion. Further, if the tubular form fabric must be coated with a synthetic resin, this crease portion is a bar to forming a uniform coating of the synthetic resin thereon.

An object of the present invention is to provide an improved fabric material for producing woven air bags which is free from the above-mentioned drawbacks of the conventional air bag utilized for protecting riders in vehicles.

Another object of the present invention is to provide an improved fabric material for producing woven air bags, each comprising a tubular weave portion and a stitched weave portion having a particular construction whereby the space occupied by the stitched weave portion can be limited to a very small area thereby remarkably increasing the bursting strength of the air bag.

A further object of the present invention is to provide a compact woven air bag whereby the space in vehicles required for positioning the air bag can be limited to a very small area.

A still further object of the present invention is to provide an improved woven air bag which is of light weight, in comparison with the conventional air bag, and which also has the capability of very quick expansion when high pressure gas is supplied thereinto.

To attain the purpose of the present invention, a typical fabric material for producing woven air bags according to the present invention has the following composition.

1. In the fabric material for making a plurality of woven air bags, a plurality of tubular weave portions are periodically formed along a direction of the warp yarns and a stitched portion is formed between two adjacent tubular weave portions. The warp yarns for constructing a face fabric of a tubular weave portion and the warp yarns for constructing a back fabric of the tubular weave portion are respectively used as the warp yarns for constructing a back fabric of the successive tubular weave portion and as the warp yarns for constructing a face fabric of the successive tubular weave portion in the above-mentioned two adjacent tubular weave portions. To create the above-mentioned construction of the fabric material, the stitched portion has a particular construction in the relative arrangement between the warp yarns and the weft yarns.

2. The tensile strength of the fabric along the warp yarn direction is stronger than that of the weft yarn direction in the tubular portion of the woven air bag.

3. In the woven air bag, the weaving shrinkage of the weft yarn is larger than that of the warp yarn in the stitched portion thereof. That is, it is preferable to design the construction of the stitched portion in such a manner that the weaving shrinkage of the weft yarn is larger than 3%, while the weaving shrinkage of the warp yarn is smaller than 3%.

4. In the woven air bag, material yarns having 15 – 35% tensile elongation are used for the warp yarn and the weft yarn.

BRIEF DESCRIPTION OF THE DRAWINGS

FIG. 1A is a schematic plan view of a part of a fabric material for producing woven air bags according to the present invention;

FIG. 1B is a schematic sectional view of the fabric material shown in FIG. 1A, along the warp yarn direction, taken along line 1B — 1B in FIG. 1A;

FIG. 1C is a weave-construction pattern of the boundary portion between a tubular portion and a stitched portion of the fabric material shown in FIG. 1A;

FIG. 1D is a cross-sectional view of the boundary portion shown in FIG. 1C, taken along the warp yarn direction;

DETAILED DESCRIPTION

Figure 2A:
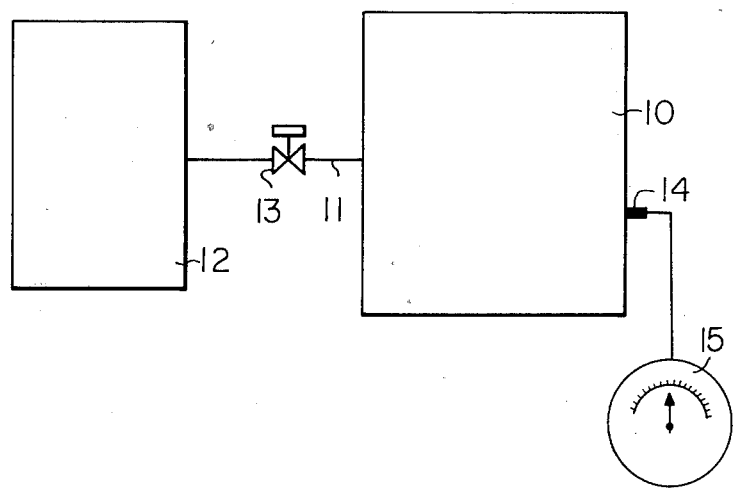
FIG. 2A is a schematic elevational view of a bursting strength of the air bag, according to the present invention.

For the sake of better understanding the present invention, a typical embodiment of the fabric material according to the present invention, for making the woven air bags, is firstly explained. This fabric material is provided with a plurality of large tubular weave portions periodically formed along a direction of the warp yarns and a stitched portion formed between two adjacent tubular weave portions, which portion is provided with at least single small tubular weave portion, wherein the warp yarns for constructing a face fabric of a tubular weave portion and the warp yarns for constructing a back fabric of the tubular weave portion are respectively used as the warp yarns for constructing a back fabric of a successive tubular weave portion and as the warp yarns for constructing a face fabric of the successive tubular weave portion in the above-mentioned two tubular weave portions, that is, in a large tubular weave portion and a small tubular weave portion or in a pair of small tubular weave portions. The woven air bag is produced by cutting the above-mentioned fabric material at the stitched portion along a direction of the weft yarns. In the construction of the above-mentioned air bag, there is provided a particular crossing relationship between the warp yarns and the weft yarns at the boundary between the tubular weave portion and the stitched portion, wherein the crossing angle of each warp yarn is smaller than the crossing angle of each weft yarn. The above-mentioned crossing angle of the warp or weft yarn means a maximum inclined angle of the yarn axis to a horizontal plane which coincides with a plane of the fabric, at a crossing point between a warp yarn and a weft yarn. Consequently, when a tensile force is applied to the fabric along the plane of the fabric, the larger shearing force is imparted to the weft yarn in comparison with the warp yarn and, therefore, if the same yarn is used for the warp yarn and the weft yarn and their densities are identical, the breaking strength of the fabric in the warp yarn direction is larger than that in the weft yarn direction. This is one of the characteristic features of the woven air bag produced by the fabric material according to the present invention.

According to our experience concerning the conventional woven air bag, it was found that, when high pressure gas is instantly supplied into the bag, the boundary portion between the tubular weave portion and the stitched portion was frequently broken. Therefore, one solution to the problem of how to increase the bursting resistance of the woven air bag is to increase the density of warp yarn in comparison with the weft yarn, or to use a thicker warp yarn having stronger tensile strength than the weft yarn. Another beneficial solution is to use the above-mentioned particular construction wherein the crossing angle of the warp yarn is remarkably smaller than the crossing angle of the weft yarn at the above-mentioned boundary portion. To effectively apply this idea, it is preferable that the weaving shrinkage of the warp yarn is less than 3% while that of the weft yarn is in between 5 and 20%. The shrinkage of the warp or weft yarn is represented by $(l - lo)/lo \times 100$ in %, wherein, $lo$ represents a length of test pieces of fabric along the warp or weft yarn, while $l$ represents a length of warp or weft yarn of the test piece.

According to our tests, it is preferable to use a warp yarn or weft yarn having a large tensile elongation in the range between 15 and 35%. This is because, when a high tensile or bursting force is applied to the boundary portion between the tubular weave portion and the stitched portion of the air bag, the so-called concentration of stress to particular warp or weft yarn or yarns can be prevented. However, if the tensile elongation of the warp yarn or weft yarn is larger than 35%, since the tensile strength of the yarn becomes lower than the tensile strength of usual yarn, such yarn can not be used as the material yarn for producing the woven air bag of the present invention.

As to the material yarn, so-called high tenacity synthetic multifilament yarn such as nylon, polyester, polyvinylalcochol, polyolefin synthetic multifilament yarn, etc., are preferably utilized.

The above-mentioned fabric material is woven in such a manner that the main portion thereof is a plurality of tubular weave portions, each having a substantially square shape when the fabric is disposed in a flat condition. In this fabric material, it is essential to construct the above-mentioned stitched portion so that the warp yarns for constructing a face fabric of a tubular weave portion and the warp yarns for constructing back fabric of the tubular weave portion are respectively used as the warp yarns for constructing a back fabric of a successive tubular weave portion and as the warp yarns for constructing a face fabric of the successive tubular weave portion in the above-mentioned two adjacent tubular weave portions.

When manufacturing the woven air bag from the fabric material according to the present invention, a seamless woven air bag can be produced by cutting the above-mentioned stitched portion along a direction of the weft yarn. However, after cutting the stitched portion as mentioned above, this edge of the cut portion may be sewed so as to prevent expected breakage of this cut portion.

The above-mentioned air bag can be used without being coated with rubber or synthetic resin. However, if it is required to coat the bag with rubber or a synthetic resin, the conventional coating, topping or laminating treatment may be applied. From the point of view of durability, coating with a chroloplane rubber or chrolosulphonic polyethylene resin is preferably utilized.

EXAMPLE 1

A fabric material for making woven air bags according to the present invention is composed of a plurality of large tubular weave portions 1 and a plurality of stitched portions 2, each formed at a position between two adjaent tubular weave portions 1 as shown in FIG. 1A. Each large tubular weave portion is formed in a square size 100 × 100 cm in both directions along the warp yarns and the weft yarns when the material fabric is in flattened condition. Therefore, the tubular weave portions 1 are formed periodically along a warp yarn direction.

The detailed construction of the tubular weave portion 1 and the stitched portion 2 are as follows.

Warp and weft yarns: "Nylon 6" polyamide multifilament, 840 denier, 136 filaments
Tensile elongation of the warp and weft yarns; 23%
Weaving construction of the tubular weave portion (face and back fabrics): plain weave
Density of yarns of the face and back fabric of the tubular weave portion: Warp yarn — 25/inch, Weft yarn — 25/inch The stitched portion 2 is composed of a pair of small tubular weave portions 2a and 2b as shown in FIG. 1B. The length of each small tubular weave portions 2a and 2b along the warp yarn direction is 2 cm.

The detailed construction of the boundary portion between two adjcaent tubular weave portions, that is, between the large tubular weave portion 1 and the small tubular portion 2a or 2b, and between two small tubular weave portions 2a and 2b, are represented by the weave construction pattern shown in FIG. 1C, and the cross section taken along a warp yarn direction is shown in FIG. 1D. Therefore, in this embodiment, the warp yarns 4a, 4b used for forming the face fabric of the tubular weave portion 1, are used for forming the back fabric of the succesive small tubular weave portion 2a, while the warp yarns 5a, 5b, used for forming the back fabric of the tubular weave porton 1, are used for forming the face fabric of the successive small tubular weave portion 2a. The weft yarns of the basic construction pattern are represented by 7a, 7b, 7c and 7d. In this embodiment, the same construction is formed at the other terminal of the stitched portion 2 and a boundary portion between two small tubular weave portions 2a and 2b, as the above-mentioned construction. Both surfaces of the fabric material are coated with chroloplane rubber in such a condition that the content of coating is 80 g/m$^2$. Thereafter, the fabric material is cut along a central weft of the stitched portion so that a plurality of woven air bags are produced.

Figure 2B:
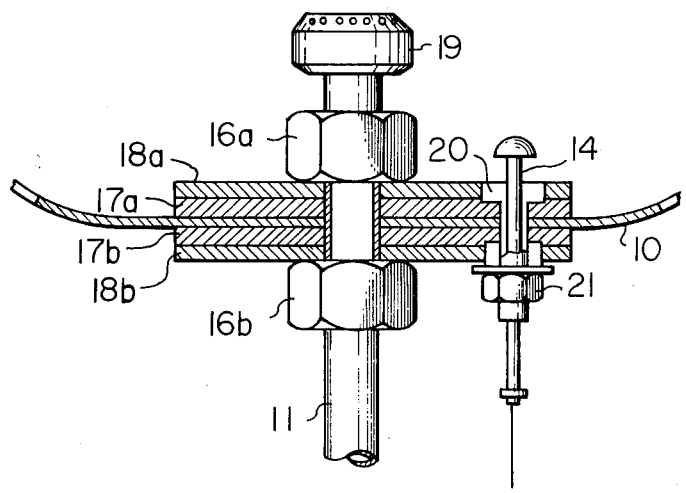
FIG. 2B is a detailed side view of a part of the bursting tester, partly in section, shown in FIG. 2A.
Figure 3A:
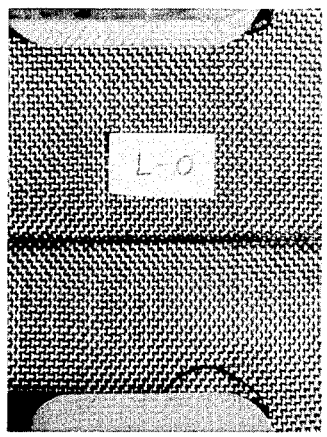
FIGS. 3A, 3B, 3C, 3D, 3E, 3F and 3G are pictures showing deformation of the above-mentioned boundary portion, during the tensile test.
Figure 3B:
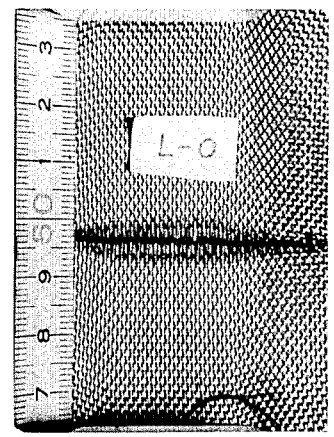
Figure 3C:
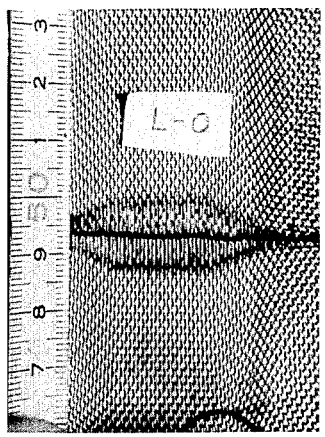
Figure 3D:
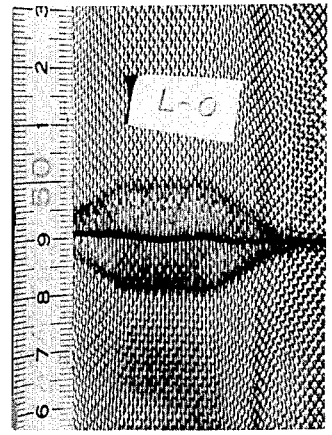
Figure 3E:
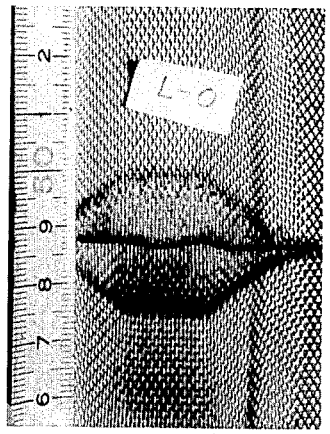
Figure 3G:
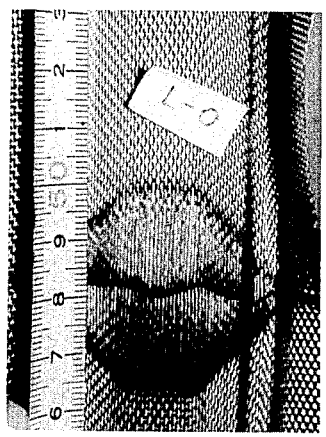
Figure 3F:
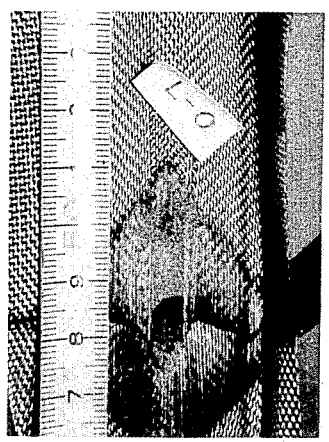

To measure the resistant property of the woven air bag against the bursting force, the following test was carried out. That is, referring to FIG. 2A, a gas-supply conduit 11 was inserted into a woven air bag 10 and the conduit 11 was connected to a high pressure gas supply chamber 12 by way of an on-off valve 13. A device for measuring the inside pressure of the woven air bag 10 was inserted in the bag 10 in an air tight condition. A conventional measuring device 14 was utilized for the measurement and this device 14 was connected to a pressure gauge 15. The detailed construction of the pressure measuring device 14 and the gas supply conduit 11 attached to the woven air bag 10 were as shown in FIG. 2B. That is, a terminal portion of the conduit 11 was inserted into the bag 10 and fastened to the air bag 10 by a pair of nuts 16a and 16b which were thread-engaged with the conduit 11. To prevent any possible leakage of gas through a possible gap between the air bag 10 and the conduit 11, a pair of rubber packings 17a, 17b and a pair of flat steel plates 18a, 18b were positioned between the nuts 16a, 16b in such a manner that the bag 10 was sandwiched from both sides by the combination of the packing 17a and the steel plate 18a, and the packing 17b and the steel plate 18b. The inside terminal of the conduit 11 was provided with a diffusing head 19 which was provided with a plurality of apertures as shown in FIG. 2B. The pressure measuring device 14 was held in an air tight condition by an auxiliary washer 20 and a fastening nut 21 which was thread-engaged with the auxiliary washer 20 which rigidly held the measuring device 14 as shown in FIG. 2B. A high pressure gas chamber 12 having a capacity of 300 $l$ gas with a inside pressure of 7.6 kg/cm$^2$, was used for the test.

According to the above-mentioned bursting test, it was found that the resistant property against the bursting force, that is, the bursting strength, of the above-mentioned woven air bag was 0.62 kg/cm². During the bursting test, the boundary portion between the weaving tubular weave portion and the stitched portion were remarkably deformed at the final stage of the test, just before the bag broke. To observe the condition of this deformation, the following tensile test was tried. That is, a grab test (ASTM D1682) was applied to inspect the breaking condition of the specimen under the following conditions.

a. Size of test specimen: 15 cm (length) × 10 cm (width)
b. the boundary line between the tubular weave portion and a stitched portion positioned at substantially the middle line of the test piece along a weft yarn direction
c. Type of tester: Constant Rate of Traverse (1R-T) (Instron type tester)
d. Constant rate of traverse: 30 cm/min.
e. Grab: 25.4 mm ravelled strip
f. The face fabric and the back fabric of the test specimen are grabed respectively.

In the above-mentioned test, the deformation of the above-mentioned boundary line portion was observed and pictures were taken at the initial condition, the conditions of loading 25, 50, 75, 100, 150 kg and the breaking condition, respectively. These pictures are shown in FIGS. 3A, 3B, 3C, 3D, 3E, 3F and 3G, respectively. From the above-mentioned observation, it was confirmed that the concentration of stress at the boundary line portion between the tubular portion 1 and the stitched portion can be effectively prevented. The breaking tensile strength of this test specimen was 180 kg/in.

EXAMPLE 2

Using th embodiment described in Example 1, a similar bursting test was applied to a woven air bag made from the above-mentioned fabric material without the coating of chroloplane rubber. The bursting strength was 0.57 kg/cm².

EXAMPLE 3

Figure 4A:
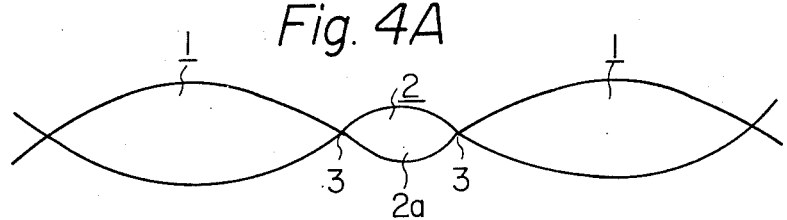
FIGS. 4A, 4B and 4C respectively show a schematic cross-sectional view of a modified fabric material according to the present invention, a weave construction pattern and a cross sectional view of the boundary portion between the tubular weave portion and the stitched portion of the fabric material according to the present invention.
Figure 4B:
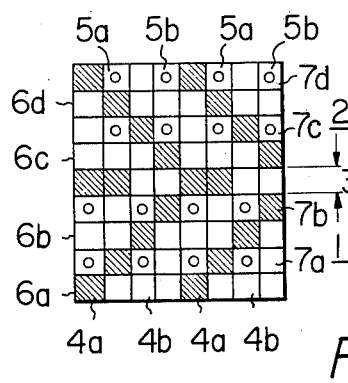
Figure 4C:
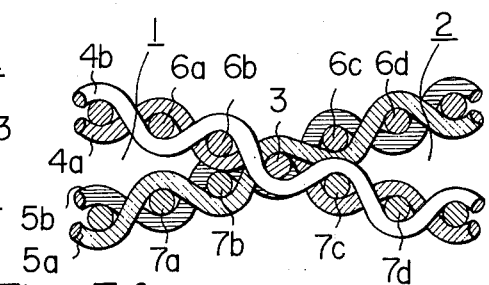

A modified embodiment of a woven air bag was produced from a fabric material composed of a plurality of large tubular weave portions 1 and a plurality of stitched portions 2 formed in such a way that each stitched portion 2 is provided with a small tubular weave portion 2a as shown in FIG. 4A. At each boundary portion between the large tubular weave portion 1 and the small tubular weave portion 2, there is provided a stitched weft yarn 3. The weave construction pattern of each boundary portion between the large tubular weave portion 1 and the small tubular weave portion 2a is shown in FIG. 4B, and the cross-sectional view of the fabric material taken-along the warp yarn direction is shown in FIG. 4C. Therefore, in this embodiment, the warp yarns 4a, 4b, used for forming the face fabric of the tubular weave portion 1, are used for forming the back fabric of small weave portion 2a of the stitched portion 2, while the warp yarns 5a, 5b, used for forming the back fabric of the tubular weave portion 1, are used for forming the face fabric of the small tubular weave portion 2a. The weft yarns of the above-mentioned basic construction pattern are represented by 7a, 7b, 7c and 7d. The length of the large tubular weave portion and that of the small tubular weave portion along the warp yarn direction are 100 cm, and 4 cm respectively and the width of the fabric material along the weft yarn direction in 100 cm. Other conditions of the above-mentioned fabric material were the same as in Example 1, and the fabric material was coated with chroloplane rubber in the same manner as in Example 1. The bursting strength of this woven air bag was 0.62 kg/cm².

EXAMPLE 5

Figure 5A:
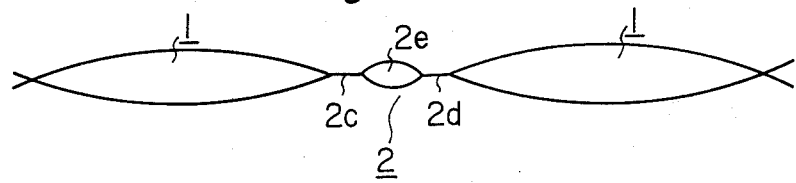
FIGS. 5A, 5B and 5C respectively show a schematic cross-sectional view of further modified fabric material according to the present invention, a weave construction pattern and a cross sectional view of the boundary portion between the tubular weave portion and the stitched portion of the fabric material according to the present invention.
Figure 5B:
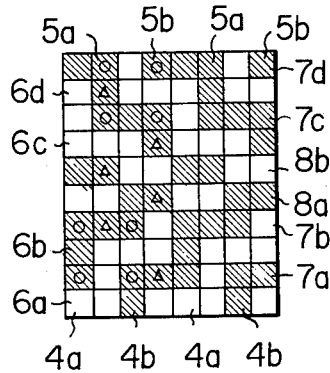
Figure 5C:
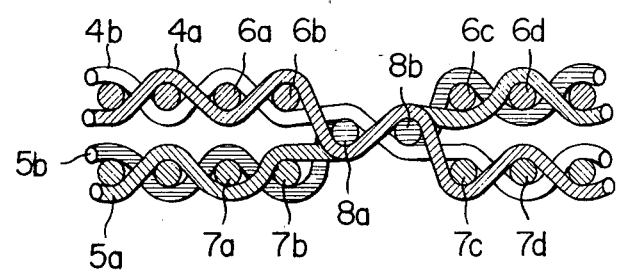

A further modified embodiment of a woven air bag was produced from a fabric material of the invention, composed of a plurality of large tubular weave portions 1 and a plurality of stitched portions 2 formed in such a way that each stitched portion 2 was between two adjacent tubular weave portions 1 as shown in FIG. 5A. In this embodiment, each stitched portion 2 was composed of a pair of single layer weave portions 2c, 2d and a small tubular weave portion 2e formed between these two single layer weave portions 2c and 2d. At each boundary portion between the large tubular weave portion 1 and the samll tubular weave portion 2e, the warp yarns 4a and 4b forming a face fabric of a tubular weave portion were used as the warp yarns forming a back fabric of a successive tubular weave portion, while the warp yarns 5a and 5b forming a back fabric of the tubular weave portion were used as the warp yarns forming a face fabric of the successive tubular weave portion (FIGS. 5B and 5C). The length of each single layer portion 2c, 2d was formed with a pair of weft yarns 8a and 8b, and the entire length of the stitched portion 2 along the warp yarn direction was 6 cm. In this embodiment, the other conditions of fabric construction were similar to those in Example 1. After coating with chroloplane rubber in the same manner as in Example 1, the woven air bag was produced by cutting the central weft portion of the stitched portion 2. The bursting strength of this woven air bag was 0.61 kg/cm². To observe the deformation of the boundary portion between the tubular weave portion 1 and the stitched portion 2, a tensile test was carried out in the same manner as Example 1, and pictures showing the deformation of the test piece, under the initial condition, the loading conditions of 25 kg, 50 kg, 75 kg, 100 kg, 150 kg and the breaking condition were taken, respectively. These pictures are shown in FIGS. 6A, 6B, 6C, 6D, 6E, 6F and 6G respectively. The breaking strength of this test piece was 183 kg/in. From the observation during the tensile test, it was confirmed that the concentration of the stress at the boundary portion between the tubular weave portion and the stitched portion could be prevented.

EXAMPLE 5

Using the embodiment described in Example 1, the warp yarn density of the face and back fabric of the tubular weave portion was increased to 30/inch respectively. The bursting strength of the woven bag was 0.73 kg/cm². It is understood that the above-mentioned increase of the bursting strength of the air bag was mainly due to an increase in the density of warp yarns which increased the fabric strength in the warp yarn direction.

EXAMPLE 6

In the embodiment of Example 4, the shrinkage of warp yarn and that of the weft yarn at the stitched portion (single weave portion) was 5 and 5%, however, in this example the fabric material, having a stitched portion wherein the warp yarn shrinkage was 2% and the weft yarn shrinkage was 10%, was made by controlling the yarn tension during the weaving operation. The bursting strength of the air bag was increased about 10%.

EXAMPLE 7

Figure 7:
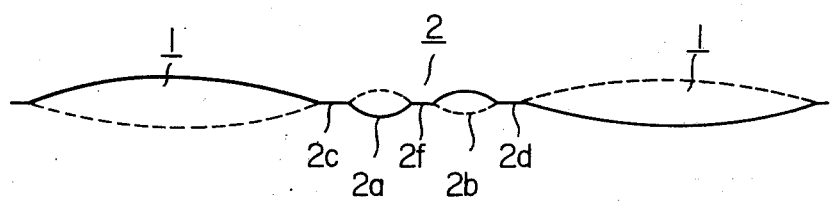
FIG. 7 is a schematic cross sectional view of further modified fabric material, taken along the warp yarn direction, according to the present invention.
Figure 8:
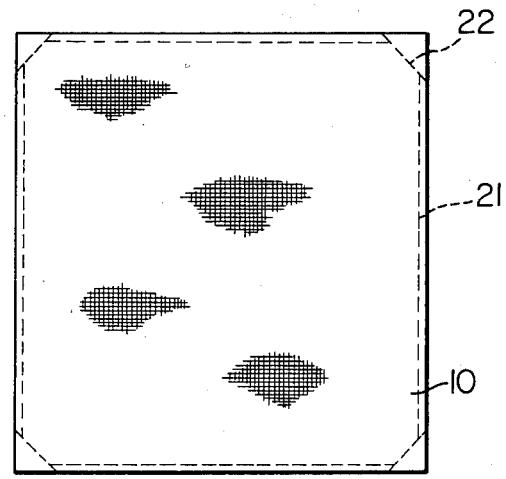
FIG. 8 is a schematic plan view of a modified woven air bag, produced from the fabric material shown in FIG. 1B.

A still further modified embodiment of a fabric material for producing the woven air bag is composed of a plurality of large tubular weave portions formed along the warp yarn direction and a stitched portion formed between two adjacent large tubular weave portions, and the stitched portion is composed of a pair of single layer weave portions 2c, 2d formed at both sides thereof and a pair of small tubular weave portions 2a and 2b formed inside the above-mentioned single layer weave portions 2c, 2d respectively and the other single layer weave portion 2f formed between the small tubular weave portions 2a and 2b as shown in FIG. 7. The length of the single layer weave portion along the warp direction was 2 cm. Other conditions of this fabric material is similar to the embodiment shown in FIG. 5A. After coating the fabric material with chroloplane rubber, the air bag shown in FIG. 8 is produced. The bursting strength of this air bag was 0.7 kg/cm². Since each corner porton of this air bag is sewn along a sewing line 22, and the edge portions of this air bag is sewn along the sewing lines 21 as shown in FIG. 7, the bursting strength thereof was increased very much.

EXAMPLE 8

Using the embodiment described in Example 1, material yarns having different breaking elongation were utilized for making the fabric material. The bursting strength of the woven air bag made from these fabric materials were as follows.

| Breaking elongation of the material yarn (%) | Bursting strength of the woven air bag kg/cm² |
|---|---|
| 10 | 0.40 |
| 15 | 0.55 |
| 25 | 0.63 |
| 35 | 0.57 |
| 45 | 0.30 |

From the above-mentioned test, it was confirmed that the preferable breaking elongation of the material yarn for making the woven air bag is in a range between 16 and 35%.

COMPARATIVE EXAMPLE 1

Figure 9:
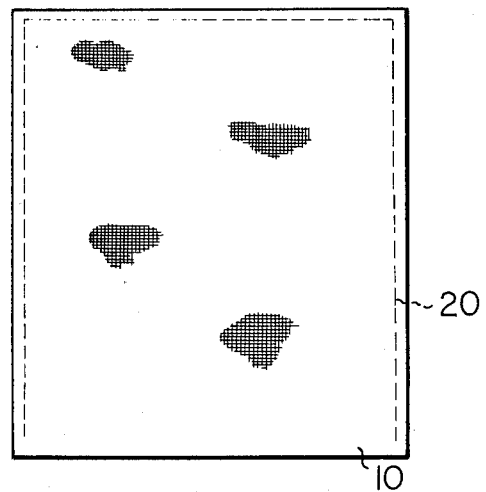
FIGS. 9 and 10 are schematic plan views of conventional air bags.
Figure 6A:
FIGS. 6A, 6B, 6C, 6D, 6E, 6F and 6G are pictures showing deformation of the above-mentioned boundary portion shown in FIGS. 5B and 5C during the tensile test.
Figure 6B:
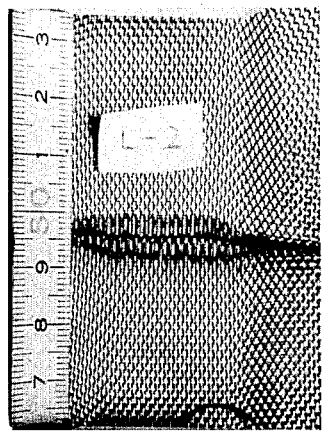
Figure 6C:
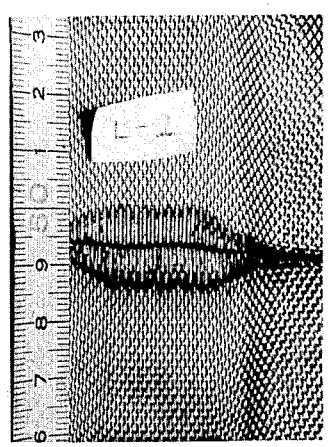
Figure 6D:
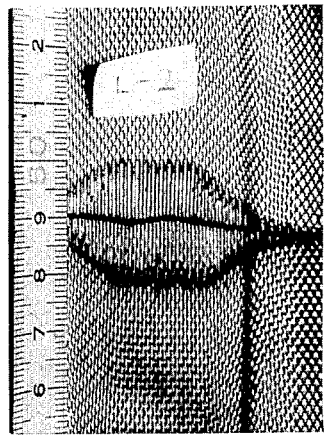
Figure 6E:
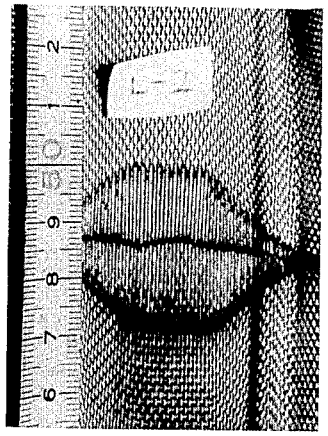
Figure 6F:
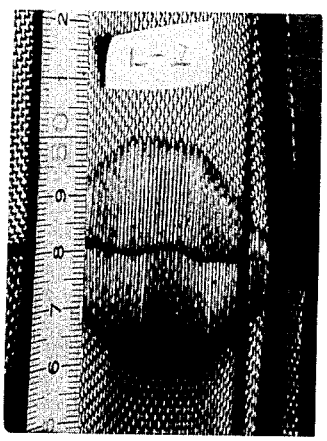
Figure 6G:
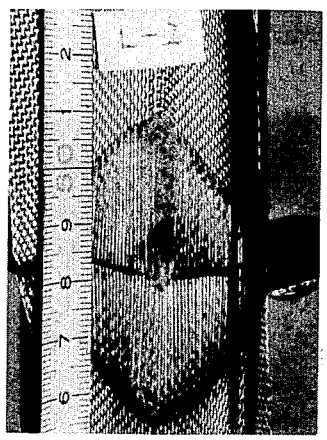

To compare the bursting strength of the woven air bag produced from the fabric material according to the present invention with that of the conventional air bag, the following fabric material was made by utilizing the same warp and weft yarns.
  a. Construction of the fabric: plain weave
  b. Density of the warp yarn and weft yarn of the face fabric and the weft fabric: 25 × 25/inch The above-mentioned fabric material was coated with chroloplane rubber in the same manner as in Example 1. The thickness of this coating was 80 g/m². This coated fabric was cut and folded, so as to form a tubular cloth, and an air bag was made by sewing three sides as shown in FIG. 9. The sewed portions are represented as 20 in FIG. 7. The bursting test was applied to the above-mentioned air bag in the same manner as in Example 1. The bursting test of this air bag was 0.40 kg/cm².

COMPARATIVE EXAMPLE 2

Figure 10:
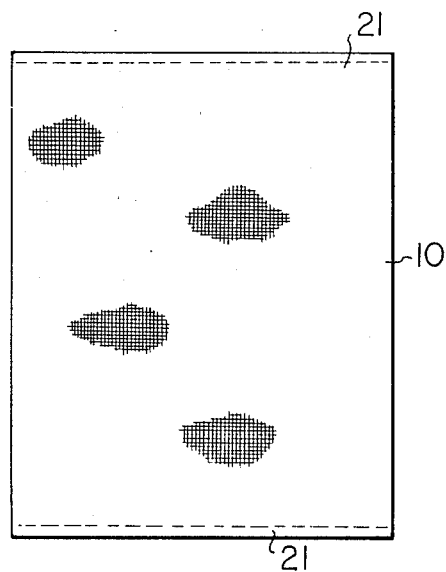

Another comparative fabric material composed of a tubular weave construction was made from the same material yarn as in Example 1. The yarn density of the warp and weft yarns was the same as in Example 1. The weave construction was a plain weave. After coating with chroloplane rubber in the same manner as in Example 1, a piece of tubular material was cut from the above-mentioned fabric material, and both opened portions were sewed so as to make an air bag, as shown in FIG. 10, wherein the sewed portions are represented by 21. The same burning test as in Example 1 was applied to the above-mentioned air bag. The bursting strength was 0.41 kg/cm². And the breaking tensile strength of a specimen wherein the above-mentioned sewed portion is positioned at the middle portion thereof and the face fabric and the back fabric are grabed, was 110 kg/in.

COMPARATIVE EXAMPLE 3

Figure 11A:
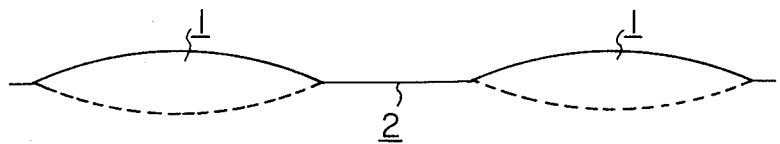
FIGS. 11A, 11B and 11C respectively show a schematic cross-sectional view of a conventional fabric material for producing air bags, a weave construction pattern and a cross sectional view of the boundary portion between the tubular weave portion and the stitched portion of the conventional fabric material.
Figure 11B:
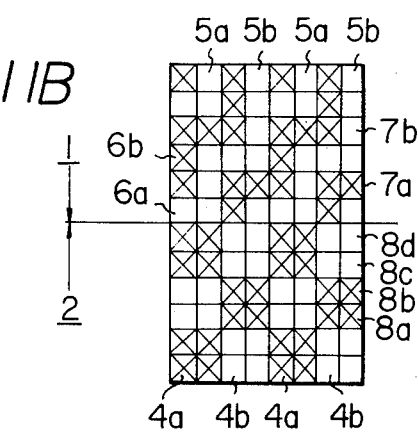
Figure 11C:
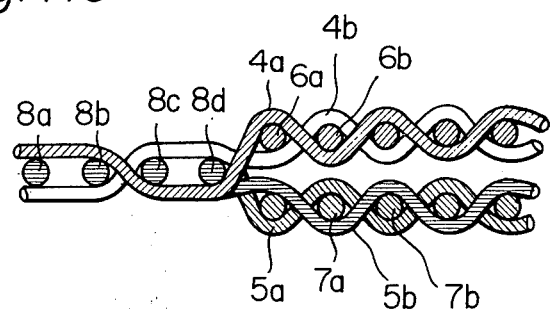

A comparative woven air bag was produced from a fabric material composed of a plurality of tubular weave portions 1 and a plurality of stitched portion 2 formed in such a way that each stitched portion 2 was between two adjacent tubular weave portions 1 as shown in FIG. 11A. The stitched portion had a mat-weave construction and the length thereof was 10 cm. In this comparative example, the warp yarns 4a, 4b always formed the face fabric of each tubular weave portion 1 together with the face weft yarns 6a and 6b, while the warp yarns 5a, 5b always formed the back fabric of each tubular weave portion 1 together with the back weft yarns 7a and 7b. These warp yarns 4a, 4b, 5a, 5b formed the mat-weave construction of the stitched portion 2 together with the weft yarns 8a, 8b, 8c and 8d as shown in the weave construction pattern, FIG. 11B. The cross-section of the boundary portion between the tubular weave portion 1 and the stitched portion 2 taken along the warp yarn direction is shown in FIG. 11C. The same material yarn as in Example 1 was used in the same density as in Example 1. After coating with chroloplane rubber in the same manner as in Example 1, a woven air bag was made from the above-mentioned fabric material in the same manner as in Example 1. The bursting strength thereof was 0.39 kg/cm², because the stress was concentrated at the boundary portion between the tubular weave portion 1 and the stitched portion 2. The pictures shown in FIGS. 12A, 12B, 12C, 12D, 12E and 12F were taken in the same manner as in Example 1, during the tensile test applied to a specimen made in the same way as in Example 1, at the initial condition, the conditions of 25 kg, 50 kg, 75 kg, 100 kg, and the breakdown condition, respectively. As is clearly shown in these pictures, the stress was concentrated at the boundary portion between the tubular portion and the stitched portion, so that the bursting strength was lowered in this test.

COMPARATIVE EXAMPLE 4

Figure 13A:
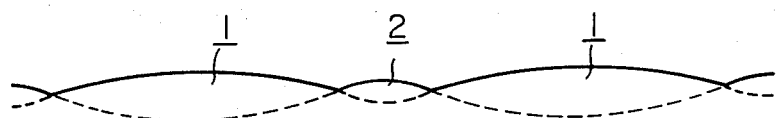
FIGS. 13A, 13B and 13C respectively show a schematic cross-sectional view of another conventional fabric material for producing air bags, a weave construction pattern and a cross-sectional view of the boundary portion between the tubular weave portion and the stitched portion of the above-mentioned conventional fabric material.
Figure 13B:
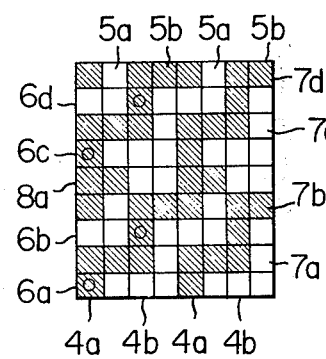
Figure 13C:
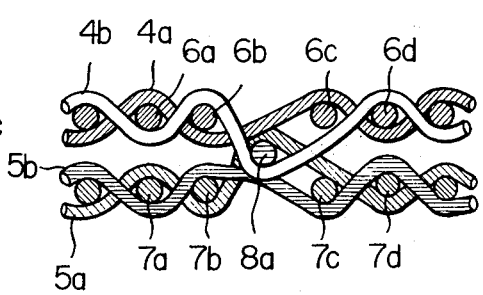
Figure 12A:
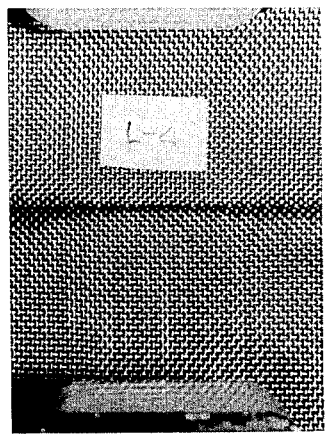
FIGS. 12A, 12B, 12C, 12D, 12E and 12F are pictures showing deformation of the above-mentioned boundary portion shown in FIGS. 11B and 11C, during the tensile test.
Figure 12B:
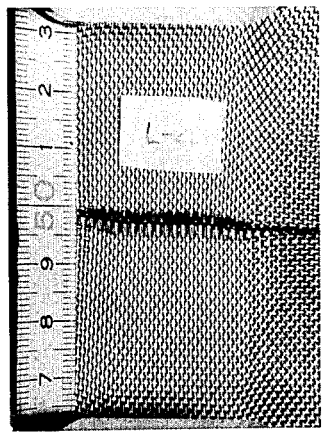
Figure 12C:
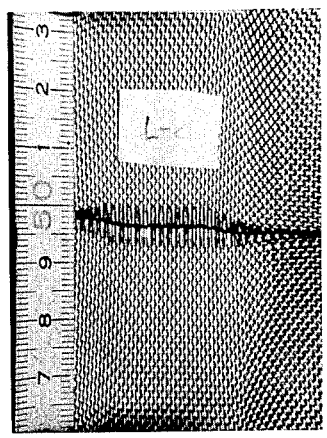
Figure 12D:
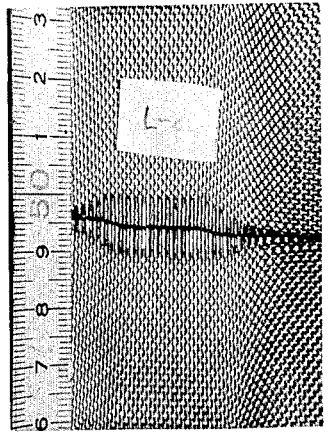
Figure 12:
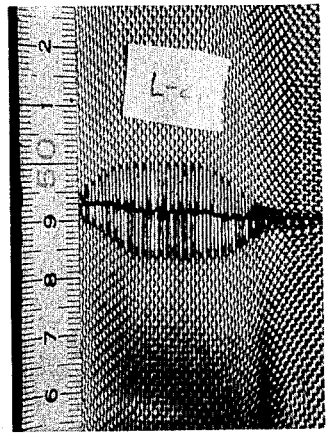
Figure 12:
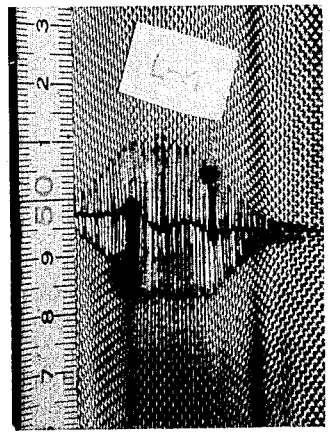
Figure 14A:
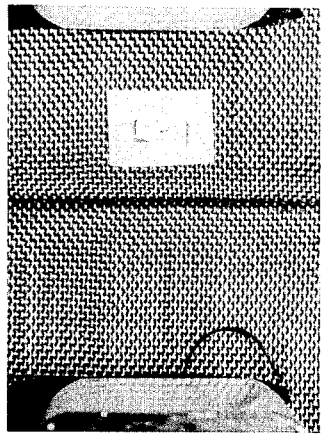
FIGS. 14A, 14B, 14C, 14D, 14E and 14F are pictures showing deformation of the above-mentioned boundary portion shown in FIGS. 13B and 13C, during the tensile test.
Figure 14B:
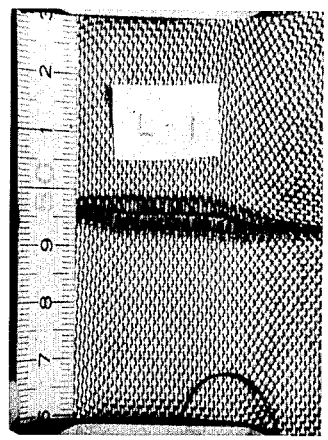
Figure 14C:
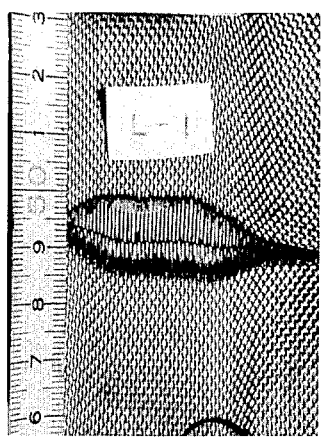
Figure 14D:
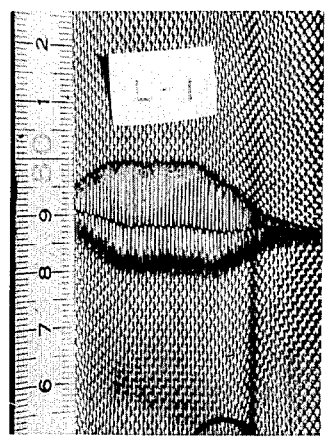
Figure 14E:
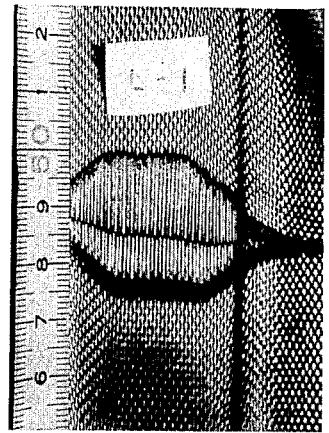
Figure 14F:
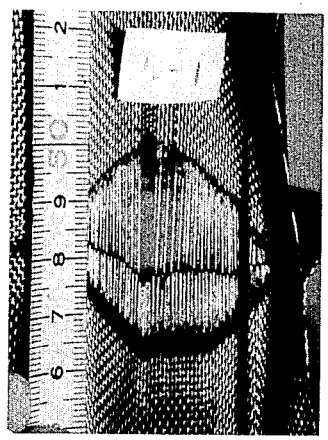

In the fabric material for producing an air bag according to the comparative example 4, the stitched portion was formed by a small tubular weave construction as shown in FIG. 13A, wherein the same warp yarns were utilized for forming the face fabric of each tubular weave portion, while the same warp yarns were utilized for forming the back fabric of each tubular weave portion as shown in FIGS. 13B and 13C. 4a, 4b represent warp yarns for forming the face fabric of each tubular weave portion 1, 2 while 5a, 5b represent warp yarns for forming the back fabric of each tubular weave portion 1, 2 while 6a, 6b represent weft yarns for forming the face fabric of each large tubular weave portion 1, 7a, 7b represent weft yarns for forming the back fabric of each large tubular weave portion 1, 8a represents a weft yarn of the boundary line between the large tubular weave portion 1 and the small tubular weave portion of the stitched portion 2. After coating the fabric material with chroloplane rubber in the same manner as in Example 1, the bursting strength and the tensile test were carried out in the same manner as in Example 1. The bursting force was 0.36 kg/cm$^2$ while the tensile strength was 115 kg/in. The pictures in FIGS. 14A, 14B, 14C, 14D, 14E and 14F, showing the deformation of the boundary portion between the tubular weave portion 1 and the stitched portion 2 were taken in the same manner as in the comparative Example 3, at the initial condition, the loading conditions of 25 kg, 50 kg, 75 kg, 100 kg and the breaking condition, respectively. As is clearly shown in these pictures, the stress was concentrated at the above-mentioned boundary portion.

What is claimed is:

1. An improved fabric material for producing woven air bags utilized for protecting occupants in vehicles, said fabric material comprising a plurality of large tubular weave portions periodically formed in the direction of the warp yarns and a stitched portion formed between two adjacent tubular weave portions, said stitched portion having at least one small tubular weave portion formed therein, the warp yarns for constructing a face fabric of said tubular weave portion and the warp yarns for constructing a back fabric of said tubular weave portion being respectively used as the warp yarns for constructing a back fabric of a successive small tubular weave portion and as the warp yarns for constructing a face fabric of said successive small tubular weave portion of said stitched portion, the crossing angle of each warp yarn at a boundary portion between said large tubular weave portion and said stitched portion being smaller than the crossing angle of each weft yarn.

2. An improved fabric material for producing woven air bags according to claim 1, wherein said large tubular weave portions and said stitched portions are coated with a thin layer of coating agent.

3. An improved fabric material for producing woven air bags according to claim 1, wherein said large and small tubular weave portions have a weaving construction pattern of plain weave.

4. An improved fabric material for producing woven air bags according to claim 1, wherein said stitched portion is constituted by a small tubular weave portion.

5. An improved fabric material for producing woven air bags according to claim 1, wherein said stitched portion is constituted by a pair of small tubular weave portions successively formed along the warp yarn direction.

6. An improved fabric material for producing woven air bags according to claim 1, wherein said stitched portion is constituted by a pair of single weave constructions and a small tubular weave portion formed between said single weave constructions.

7. An improved fabric material for producing woven air bag according to claim 1, wherein said stitched portion is constituted by a pair of single weave constructions and a pair of small tubular weave portions formed adjacent and inside said single weave constructions and a single weave construction formed between said small tubular weave portions.

8. An improved fabric material for producing woven air bags according to claim 1, wherein said material yarn is a polyester multifilament yarn.

9. An improved fabric material for producing woven air bags according to claim 1, wherein said material yarn is a polyamide multifilament yarn.

10. An improved fabric material for producing woven air bags according to claim 1, wherein said material yarn is a polyolefin multifilament yarn.

11. An improved fabric material for producing woven air bags according to claim 1 wherein the breaking strength of said fabric material in the warp yarn direction at the boundary portion between said large tubular weave portion and said stitched portion is larger than that of fabric material in the weft yarn direction.

12. An improved fabric material for producing woven air bags according to claim 11 wherein the material yarn utilized as the warp and weft yarns of said fabric material has a breaking elongation in a range between 15 and 35%.

* * * * *